March 3, 1970     T. G. CAMPBELL     3,497,973
COMPACT HIGH STRENGTH REPLACEABLE CUTTING EDGE
Filed May 1, 1967     2 Sheets-Sheet 1
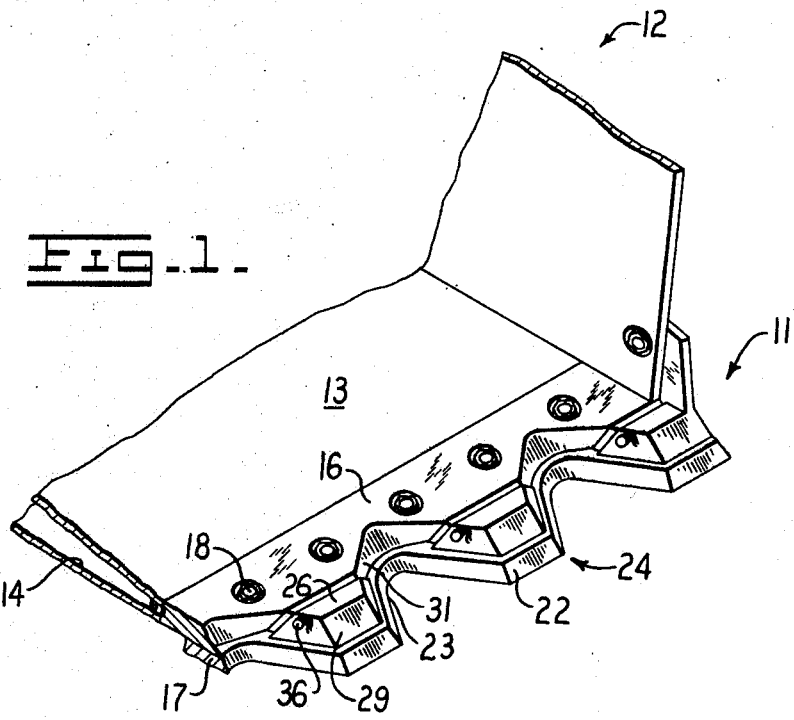
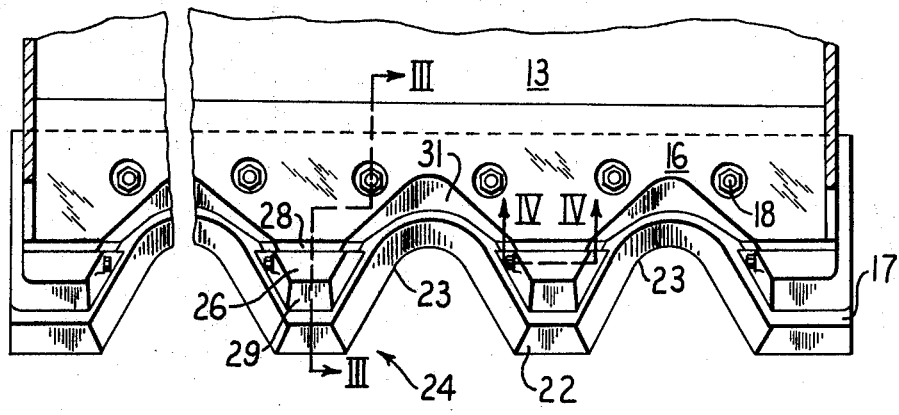
INVENTOR.
TREVOR G. CAMPBELL
BY
ATTORNEYS

INVENTOR.
TREVOR G. CAMPBELL

United States Patent Office 3,497,973
Patented Mar. 3, 1970

3,497,973
COMPACT HIGH STRENGTH REPLACEABLE
CUTTING EDGE
Trevor G. Campbell, Peoria, Ill., assignor to Caterpillar
Tractor Co., Peoria, Ill., a corporation of California
Filed May 1, 1967, Ser. No. 635,208
Int. Cl. E02f 3/81; A01b 35/20
U.S. Cl. 37—141    5 Claims

ABSTRACT OF THE DISCLOSURE

To strengthen a replaceable cutting element of a loader bucket or the like, one or more sockets are provided along the upper surface of the element to receive structural members which project forward from the bucket floor, the sockets being situated forwardly from the bolts or the like which attach the cutting element to the bucket. This transfers stress at the front of the cutting element to the bucket structure thereby avoiding shearing of the bolts and providing for a more compact construction. In a preferred form, means within the sockets exert a wedging force between the cutting element and the bucket projections, a compressed resilient material such as rubber being particularly advantageous for this purpose.

BACKGROUND OF THE INVENTION

This invention relates to power operated apparatus for handling bulk material and more particularly to the replaceable cutting edge structure utilized on loader buckets, scrapers and the like to facilitate the loading of earth or other materials.

Several forms of powered earthmoving apparatus and general purpose bulk materials handling equipment have a material carrying receptacle which is loaded by being forcibly driven into the material. Power loaders and scrapers are typical of such equipment. Apparatus of this general type usually requires a high strength wear resistant cutting edge to bite into hard and sometimes abrasive material. In many instances, the cutting elements include a series of projecting teeth to facilitate the loading operations. Such teeth must also be wear resistant and of high strength to avoid excessive breakage.

To provide for replacement of the cutting elements when excessive wear or breakage occurs, a variety of constructions have been developed in which the cutting edge or teeth are attached to the bucket or the like by disengageable means. As heretofore designed, these constructions have not been fully satisfactory in several respects.

In particular, the forwardly projecting cutting structure has heretofore been fastened to the associated bucket or the like only at the rearward portion of the cutting element. The forward portions of the cutting edges or teeth in these prior constructions are therefore unsupported by any external means. As a consequence, the cutting elements must either be of massive construction or else lack the degree of strength which would be most desirable. A further consequence is that the bolts or the like which attach the rear portion of the cutting elments to the bucket are subjected to extremely high stresses and breakage at this point is common.

Further, many of these prior constructions require adapters or other support elements which are of undesirably great vertical extent. It is frequently preferable that the replaceable cutting element structure be kept compact, particularly in the vertical direction. A high profile increases the resistance to penetration of the cutting elements into the earth or other material and may interfere with other moving opponents of the apparatus. Co-pending application Ser. No. 591,862 of Trevor G. Campbell, filed Nov. 3, 1966, and entitled "Ejector Mechanism for Loader Buckets," discloses a loader having an ejector uniquely designed to follow closely along the surface of flat bucket floor. Any cutting edge elements on a bucket which project upward from the floor surface will interfere with operation of such an ejector. For these and other reasons, it is generally desirable that cutting elements and associated components have a low profile.

Still another undesirable characteristic of many replaceable cutting element constructions, particularly those utilizing rock teeth or the like, is that the cutting element assembly is composed of many essentially separate elements each of which must be individually replaced thereby complicating and prolonging the cutting element replacement operation. Further, the use of a series of distinct cutting elements in this manner does not maximize strength in that any one of the elements such as a tooth, for example, does not contribute any support to the adjacent elements.

Thus, the prior forms of replaceable edge cutting elements are subject to structural weaknesses in the absence of massive construction, are excessively bulky, particularly in the vertical direction, and may require excessive effort to effect replacement.

SUMMARY OF THE INVENTION

This invention is a cutting element assembly providing for high strength and ease of replacement in a compact structural arrangement. The construction provides for external support and re-enforcement of the projecting front portion of the cutting elements through sockets thereon which receive forwardly extending members of the associated bucket or the like, the sockets being situated well forward of the bolts or other fasteners which attach the cutting element to the bucket. Additional means are disposed within the sockets to insure tight engagement between the cutting element sockets and bucket projections and in a preferred form are comprised of a filler material such as rubber which may be caused to exert pressure against both the cutting element and bucket projection by being compressed by means such as a bolt or the like. Where teeth are desired at the cutting edge, notches may be provided between the sockets to define tooth-like projections.

Thus, it is an object of the present invention to provide a very strong, stress-resistant cutting edge for a loader bucket or the like which is also compact and easily replaced.

The invention, together with further objects and advantages thereof, will be better understood by reference to the following detailed description of preferred embodiments in conjunction with the accompanying drawings.

BRIEF DESCRIPTION OF THE DRAWINGS

In the accompanying drawings:

FIGURE 1 is a perspective view of a forward corner portion of a power loader bucket having a toothed cutting edge construction thereon in accordance with the invention;

FIGURE 2 is a plan view of the cutting edge structure of FIGURE 1;

DESCRIPTION OF THE PREFERRED EMBODIMENTS

Figure 3:
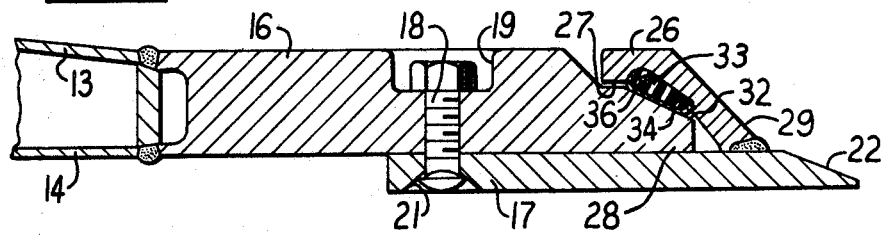
FIGURE 3 is a staggered section view taken along line III—III of FIGURE 2 illustrating internal details of the cutting edge structure thereof.

Referring now to FIGURES 1 and 2 of the drawing in particular, a first embodiment of the replaceable cutting edge construction 11 is shown attached to a loader bucket 12 of the general type described in the hereinbefore identified co-pending application Ser. No. 591,862. Such a loader bucket 12 may typically have a floor formed by vertically spaced flat members 13 and 14 which are joined along the forward edge by being welded to a vertically thicker flat structural member 16. Member 16 thus defines the forward edge of the bucket floor and is the element to which a replaceable cutting edge, here formed by a serrated plate 17, attaches. Referring now to FIGURES 2 and 3 in combination, plate 17 is disposed against the underside of the forward portion of member 16 and is removably fastened thereto by a series of bolts 18 distributed along the length of the two elements. To minimize the thickness of the assembly in the vertical direction, the bolts 18 are preferably of less length than the combined thicknesses of member 16 and plate 17 which have recesses 19 and 21, respectively, to receive the enlargements at the two ends of the bolt. It will be apparent that other disengageable fastening means may be substituted for the bolts 18 if desired.

Plate 17 projects forward from the bucket member 16 and has a beveled front edge 22 which constitutes the cutting surface that bites into the earth or other material to be received in the bucket 12. It is a particularly advantageous feature of the invention that the plate 17 may readily be formed to provide a straight cutting edge or as in the present embodiment may have spaced indentations 23 to define a series of tooth-like projections 24, thereby obviating the need to attach and remove a series of teeth separately where such elements are to be utilized.

Considering now the means by which external support and re-enforcement are provided for the forwardly projecting portion of the cutting edge plate 17, a plurality of sockets 26 are provided along the upper forward surface of the plate. Where the plate 17 is notched as in this embodiment to provide the tooth-like projections 24, one of the sockets 26 may be situated on each such projection.

Each of the sockets 26 defines a tapering passage 27 which is open at the rearward end to receive one of a series of conforming projections 28 of the bucket structural member 16. The sockets 26 preferably have an external configuration, including a beveled forward edge 29, conforming with the tooth-like character of the associated projection 24 of plate 17 and may be welded thereto to form an effectively integral unit therewith. To further preserve the tooth-like external configuration of the assembly, the forward portions of bucket member 16 which are situated between the tooth projections 24 on plate 17 may be notched to conform therewith and are provided with a beveled surface 31.

Figure 4:
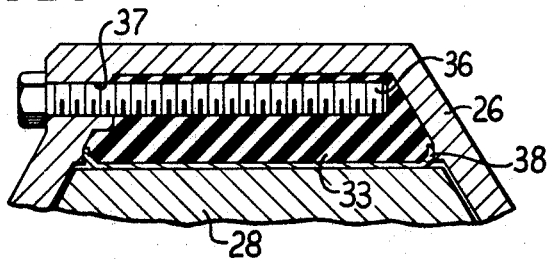
FIGURE 4 is a section view taken along line IV—IV of FIGURE 2 illustrating further details of the internal construction of the cutting edge.

As best shown in FIGURE 3, the projections 28 of bucket member 16 which extend into the sockets 26 have an upper forward surface 32 which slopes downwardly toward the cutting edge surface 22 to exert a wedging force against the similarly inclined upper surface of socket passage 27. The support and re-enforcement which bucket projection 28 provides at the front portion of cutting edge plate 17 is greatly increased by situating means, comprised of a rubber plug 33 in this embodiment, within socket 26 to bear against both the projection and the inner upper surface of passage 27. To receive the plug 33, a cavity 34 is provided in socket 26 at the upper surface of passage 27. Referring now to FIGURE 4 in conjunction with FIGURE 3, the resilient plug 33 is expanded after the cutting edge plate 17 has been implaced on the bucket member 16, and bolts 18 have been tightened, by tightening a bolt 36 which is threadably engaged in a bore 37 at one side of socket 26 and which extends into the bulk of the plug 33. To avoid unwanted severe distortions of the plug 33 at the junctures adjacent rigid elements, a thin backing plate 38 is disposed between the plug and the upper forward surface 32 of bucket member projection 28 and has upwardly curving edges to protect the adjacent portions of the plug. While the bolts 36 provide a particularly convenient means of compressing the plug 33, it will be apparent that other means may be used for this purpose.

Referring now to FIGURES 1–4 generally, it may be seen that the replaceable cutting edge construction 11 provides a clearly higher strength structure than can be obtained by simply bolting a cutting edge or teeth of equivalent size to the forward portion of the bucket in the customary manner in which the cutting edge or teeth simply extend forward from the engagement with the bucket without supplementary support. To provide anything approaching equivalent strength, the components of the conventional structure must necessarily be more massive. The cutting edge assembly 11 is very easily replaced by merely removing and subsequently replacing the bolts 18. It may further be seen that the construction 11 provides for tooth projections, where desired, which are elements of an integral member and therefore provide mutual support and re-enforcement for each other.

Figure 5:
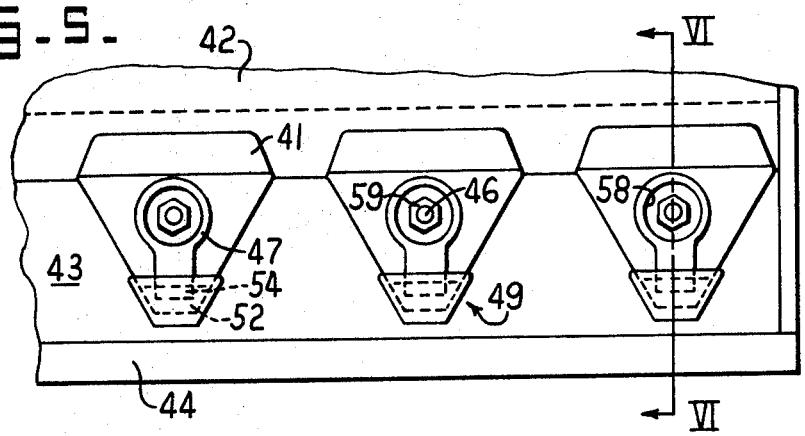
FIGURE 5 is a plan view of a modified embodiment of the cutting edge structure.
Figure 6:
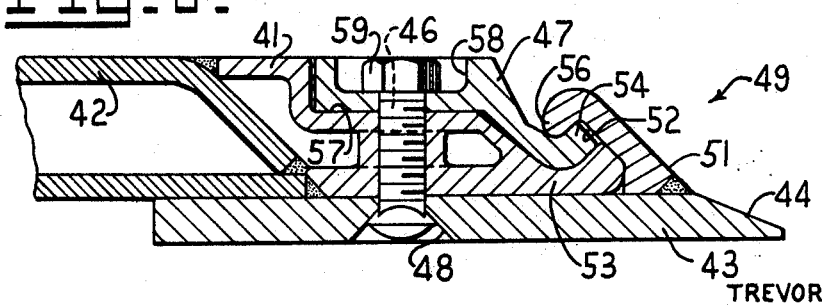
FIGURE 6 is a staggered cross-section view taken along lines VI—VI of FIGURE 5 showing the internal structure of the modified embodiment thereof.

Modifications of the replaceable cutting edge structure may be made while retaining the basic advantages of the invention. Referring now to FIGURES 5 and 6 in conjunction, a second embodiment of the invention is shown which provides a straight cutting edge and employs modified means for supporting and re-enforcing the forward portion thereof.

In the construction of FIGURES 5 and 6, a series of structural members 41 are welded along the forward edge of a bucket floor 42 to provide for the attachment of the plate 43 which extends forward and which has a beveled front edge 44 defining the cutting edge. The cutting edge plate 43 is again held against the underside of the bucket structural members 41 by disengageable bolts 46 transpierced through both members and through a suprajacent retainer element 47 which will be hereinafter described in greater detail. As in the previous embodiment, the heads of bolts 46 are preferably set into recesses 48 at the underside of plate 43 to minimize the vertical profile. A series of modified sockets 49 are situated along the upper surface of the forward portion of the cutting edge plate 43 and are preferably welded thereto to form an integral unit therewith. Sockets 49 have a sloping forward surface 51 and define a rearwardly opening cavity 52 into which projections 53 of bucket structural members 41 extend to re-enforce and support the front portion of cutting edge plate 43. To provide for a tight and effective engagement between the bucket member projections 53 and the sockets 49 in this embodiment, arcuate forwardly extending fingers 54 of the retainers 47 extend into the socket cavities 52 between the projections 53 and downwardly curving lip 56 at the top of the socket, the abutting surfaces of lip 56, retainer 47, and projections 53 having conforming curvatures. The rearward section of each retainer 47 fits on a shelf 57 formed in the upper surface of bucket members 41 and is retained thereagainst by the previously described bolts 46 which transpierce the retainer and extend into a recess 58 at the upper surface thereof to receive the nuts 59 associated with the bolts. To provide compactness together with high strength, the several parts are proportioned so that the upper surfaces of bucket floor 42, bucket members 41 and retainer 47 are in alignment with the recesses 58 being sufficiently deep that bolts 46, including nuts 59, do not project thereabove.

Thus, many variations are possible within the scope of the invention, and it is not intended to limit the invention except as defined in the following claims.

What is claimed is:
1. In a material-carrying receptacle of the class which is driven into materials to be loaded and which has a forwardly facing opening requiring a cutting edge thereat, a replaceable cutting element construction comprising:
   a structural member secured to said receptacle at said opening and having a plurality of projections extending forward therefrom and having a plurality of notches between said projections,
   a replaceable cutting element plate member extending across said forwardly facing opening of said receptacle, said cutting element plate overlapping said structural member and extending forward therefrom a greater distance than said projections thereof and having a plurality of rearwardly opening sockets at a front portion into each of which a separate one of said projections is received, said cutting element plate being notched at positions corresponding to said notches of said structural member with said notches of said cutting element plate and said structural member being beveled to impart a tooth-like configuration to the upper forward portion of said cutting element construction, and
   a disengageable fastener attaching said cutting element plate to said structural member at a location rearward from said sockets of said cutting element plate.

2. In a material carrying receptacle of the class which is driven into materials to be loaded and which has a forwardly facing opening requiring a cutting edge thereat, a replaceable cutting element construction comprising:
   a structural member secured to said receptacle at said opening and having a plurality of spaced-apart projections extending forward therefrom,
   a replaceable cutting element plate overlapping said structural member and extending forward therefrom a greater distance than said projections thereof and having a plurality of rearwardly opening sockets at a front portion into which said projections are received, said sockets being spaced apart along the top surface of said front portion of said cutting element plate,
   a plurality of disengageable fasteners attaching said cutting element to said structural member, said fasteners being situated rearwardly from said sockets of said cutting element and
   a retainer element disposed within each of said sockets above the upper surface of said structural member projection therein and bearing against said upper surface of said projection and the inner surface of said socket to provide for a tight engagement between said projection and said socket.

3. The combination defined in claim 2 wherein said retainer element within said socket is a portion of a rigid retainer which extends rearwardly from said socket on the opposite side of said structural member from said cutting element and which is secured to said structural member by an associated one of said disengageable fasteners.

4. The combination defined in claim 2 wherein said retainer element is a volume of yieldable material and further comprising means for compressing a first portion of said volume whereby other portions thereof expand to exert pressure against said surfaces of both said socket and said structural member projection thereby providing for a tight fit therebetween.

5. The combination defined in claim 4 wherein said means for compressing a portion of said volume of material is a bolt transpierced through a portion of said socket and threadably engaged therewith, said bolt extending into said volume of material.

References Cited

UNITED STATES PATENTS

| | | | |
|---|---|---|---|
| 1,009,662 | 11/1911 | Goyeneche | 172—751 X |
| 1,872,307 | 8/1932 | Lehman | 37—141 |
| 1,963,847 | 6/1934 | Jersey | 37—141 |
| 2,285,039 | 6/1942 | Lowe | 37—141 |
| 2,390,611 | 12/1945 | Nixon | 37—141 XR |
| 2,716,824 | 9/1955 | Francis | 37—141 X |
| 2,911,120 | 11/1959 | Reinhardt et al. | 37—141 X |
| 3,160,967 | 12/1964 | Nichols | 37—141 |
| 3,219,214 | 11/1965 | Baer | 214—145 |
| 3,345,765 | 10/1967 | Petersen | 37—142 |
| 3,349,508 | 10/1967 | Petersen | 37—142 |

EDGAR S. BURR, Primary Examiner

U.S. Cl. X.R.

172—719, 751